United States Patent [19]

Fatur

[11] 4,086,823
[45] May 2, 1978

[54] TRANSMISSION AND THROTTLE CONTROL ARRANGEMENT

[75] Inventor: Richard N. Fatur, Eastlake, Ohio

[73] Assignee: Towmotor Corporation, Mentor, Ohio

[21] Appl. No.: 809,726

[22] Filed: Jun. 24, 1977

[51] Int. Cl.² ............................................. G05G 1/14
[52] U.S. Cl. ........................................ 74/474; 74/512; 74/513; 60/431
[58] Field of Search ................. 74/474, 478, 512, 513; 60/431, 433

[56] References Cited

U.S. PATENT DOCUMENTS

| Re. 27,813 | 11/1973 | Haffner | 74/474 |
| 3,003,309 | 10/1961 | Bowers et al. | 60/431 |
| 3,401,522 | 9/1968 | Hann et al. | 74/473 X |
| 3,952,512 | 4/1976 | Feller | 60/431 |

*Primary Examiner*—Edgar W. Geoghegan
*Attorney, Agent, or Firm*—Phillips, Moore, Weissenberger, Lempio & Majestic

[57] ABSTRACT

A foot pedal is connected to a first link which is also connected to the first arm of a bellcrank. The bellcrank is secured to an input shaft of a hydrostatic transmission. The first link is adapted to reciprocate in opposite directions upon pivoting of the foot pedal in opposite directions. A second link, interconnected between a second arm of the bellcrank and an engine throttle control lever, is adapted to pivot the throttle control lever in the same direction in response to reciprocation of the first link in either direction thereof. Thus, depression of the pedal in either direction will actuate the transmission to place it in its forward or reverse mode of operation whereas the throttle control lever will be actuated in the same direction in response thereto.

6 Claims, 3 Drawing Figures

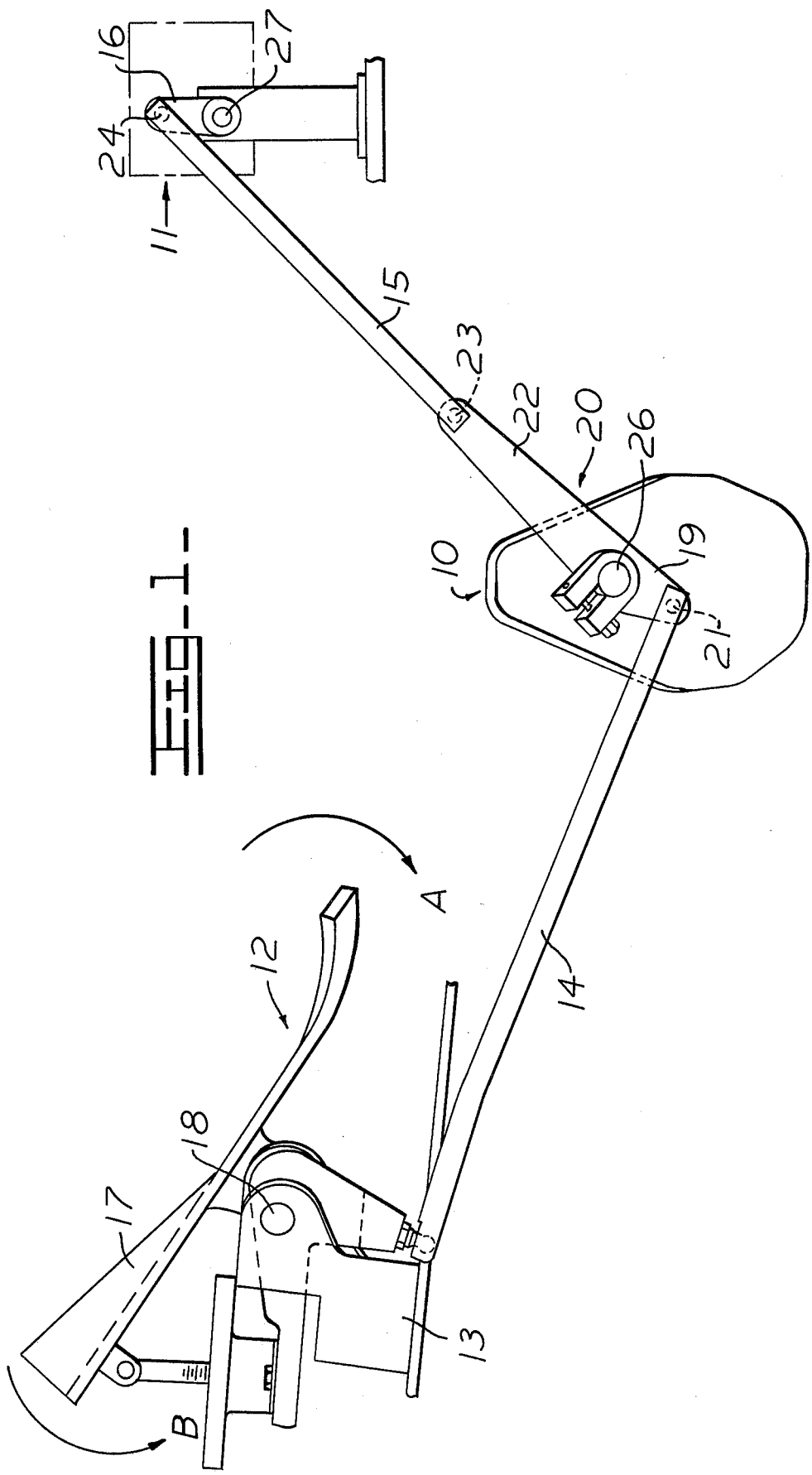

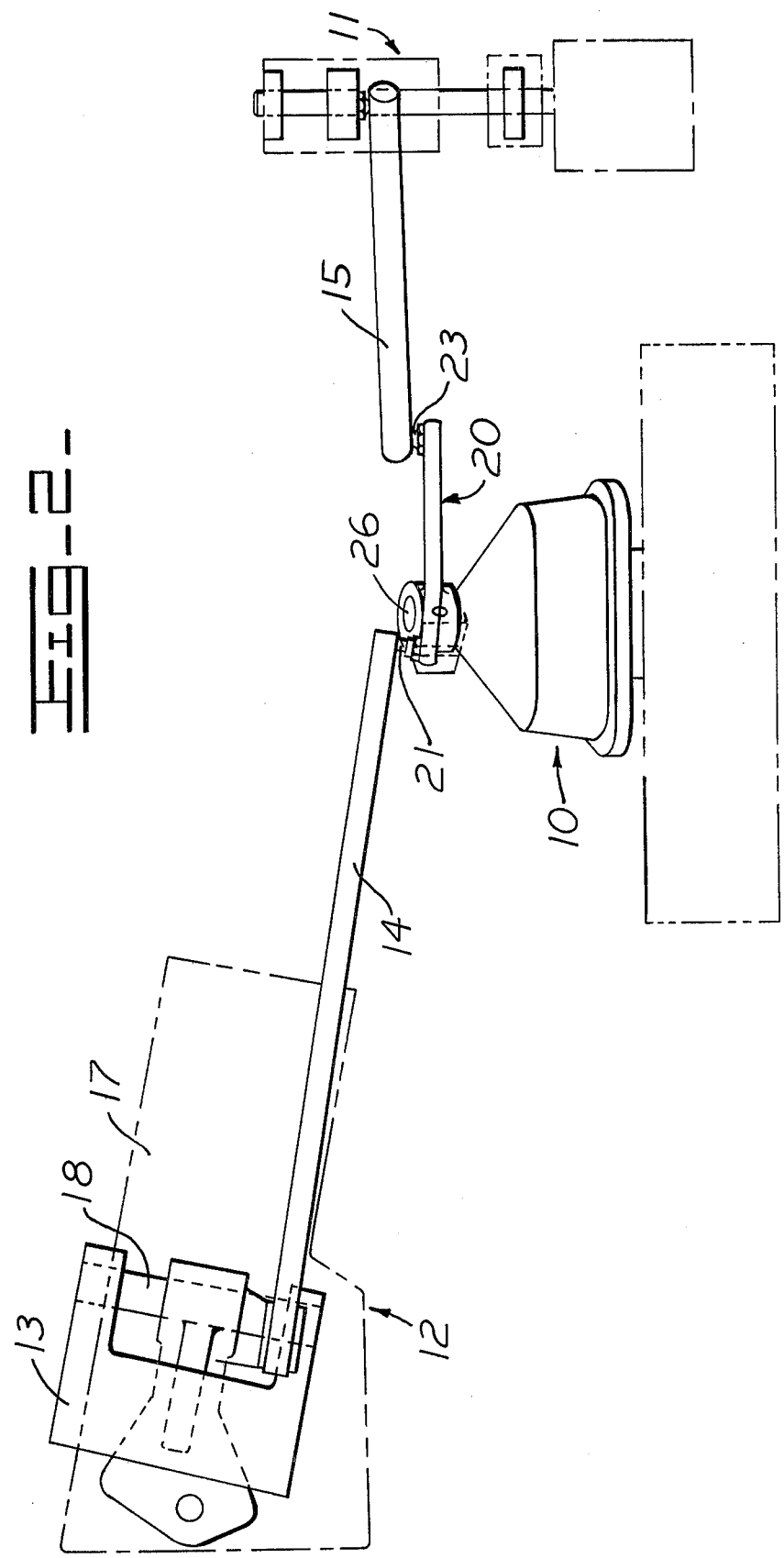

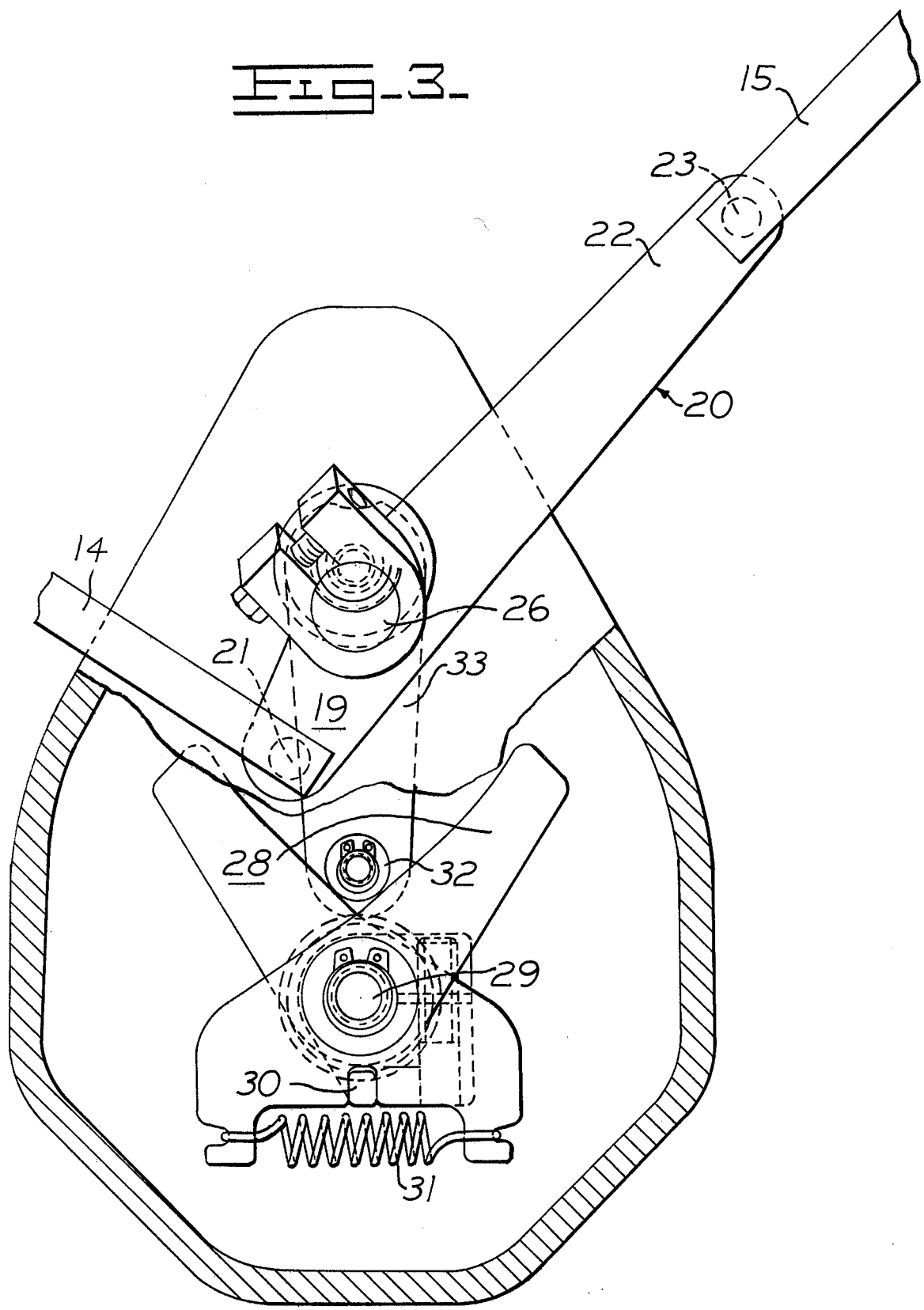

TRANSMISSION AND THROTTLE CONTROL ARRANGEMENT

BACKGROUND OF THE INVENTION

The advent of the hydrostatic transmission has dictated the need for an operator control system which will selectively actuate a control valve of the transmission into its various operative positions. In addition, the operator must closely control the speed of the engine which drives the pump of the hydrostatic transmission, simultaneously with actuation of the control valve. It is desirable to construct and arrange such a control system in a compact and non-complex manner, including the use of a minimum number of movable components in the linkage systems therefor.

In addition, it is further desirable to employ a foot pedal or the like which is adapted to be rocked in opposite directions to place the transmission in its forward or reverse modes of operation and simultaneously effect a unidirectional movement of a throttle control for the engine. U.S. Pat. No. 3,952,512, assigned to the assignee of this application, discloses a control system of this type wherein a bidirectional control valve of a hydrostatic transmission and a unidirectional throttle control for an engine are operated simultaneously by a common foot pedal.

SUMMARY OF THE INVENTION

The present invention is directed to overcoming one or more of the problems as set forth above.

The improved transmission and throttle control arrangement of this invention comprises first link means interconnected between a bellcrank, secured to an input shaft of a transmission control, and an actuating means movably mounted on a support for operator movements between first and second operative positions. The first link means is reciprocal in a first direction upon movement of the actuating means to its first position and reciprocal in a second direction, opposite to the first direction, upon movement of the actuating means to its second position. A second link means is interconnected between the bellcrank and a throttle control for movement in the same direction in response to reciprocation of the first link means in both its first and second directions.

BRIEF DESCRIPTION OF THE DRAWINGS

Other objects of this invention will become apparent from the following description and accompanying drawings wherein:

FIG. 1 is a side elevational view illustrating the transmission and throttle control arrangement embodying this invention;

FIG. 2 is a bottom plan view of the control arrangement; and

FIG. 3 is a partially sectioned and enlarged view of a hydrostatic transmission control employed in the control arrangement.

DETAILED DESCRIPTION

FIG. 1 illustrates a transmission and throttle control arrangement comprising a transmission control means 10 adapted for connection to a control valve (not shown) of a hydrostatic transmission and a throttle control means 11 mounted on an internal combustion engine (not shown) to selectively vary engine speed in the conventional manner. An actuating means or standard foot pedal arrangement 12 is movably mounted on a stationary bracket support 13, adapted to be mounted in an operator's cab of a vehicle. A first link means 14 is interconnected between transmission control means 10 and actuating means 12 whereas a second link means 15 is interconnected between the transmission control means and a control lever 16 of throttle control means 11.

Actuating means 12 includes a foot pedal 17 adapted to be rocked about the axis of a pivot pin 18, pivotally mounting the foot pedal on bracket support 13. Foot pedal arrangement 12 is more specifically described in U.S. Pat. Application Ser. No. 766,100, filed on Feb. 7, 1977 by James H. Povejsil for "Comfort Angle Adjustment For Vehicle Pedal". Such application is assigned to the assignee of this application.

The pedal may be actuated from its illustrated neutral position to a first or clockwise position or a second counterclockwise position, about the pivot pin. As will be hereinafter more fully described, a unidirectional motion will be transmitted to throttle control means 11, irrespective of the direction of movement of foot pedal 17. In order to effect such desiderata, first link means 14 is pivotally connected directly to a first arm 19 of a bellcrank 20 by a pin 21.

A second arm 22 of the bellcrank is pivotally connected directly to link means 15 by a pin 23. Link means 15 is further pivotally connected directly to control lever 16 by a pin 24 and the control lever is secured on a rotary control shaft 27 of throttle control means 11. Bellcrank 20 is secured on a rock or input shaft 26 of transmission control means 10 which is adapted to selectively control the direction and displacement of a hydrostatic transmission in a manner hereinafter more fully described.

From the above description it can be seen that clockwise movement A of foot pedal 17 in FIG. 1, about pivot pin 18, will function to move link means 14 leftwardly. In response thereto, bellcrank 20 and input shaft 26 to transmission control means 10 will pivot in a clockwise direction. Such movement of the bellcrank functions to carry link means 15 downwardly to pivot throttle control lever 16 and control shaft 27 in a counterclockwise direction whereby the speed of the engine may be changed under control of the operator.

A like unidirectional movement of the throttle control lever will occur when foot pedal 17 is depressed by the operator to pivot it in a counterclockwise direction B, about pivot pin 18 and opposite to direction A. In particular, depression of the foot pedal in direction B will function to move link means 14 rightwardly in FIG. 1. Such movement of the link means will pivot bellcrank 20 and input shaft 26 in a counterclockwise direction whereby link means 15 will be moved upwardly and leftwardly. Thus, throttle control lever 16 and control shaft 27 will pivot in the same direction upon depression of foot pedal 17 in either direction A or B.

FIG. 3 partially illustrates a control mechanism employed in transmission control means 10. Details of such control mechanism are disclosed in U.S. Patent Application Ser. No. 809,725, filed on June 24, 1977, by William I. Callaghan for "Control Mechanism for Hydrostatic Transmissions". Such application is assigned to the assignee of this application.

The transmission control mechanism essentially comprises a pair of levers 28 pivotally mounted for relative movement on a rock shaft 29 which is adapted for connection to a rotary control element of a hydrostatic transmission in a conventional manner. A bracket (not shown) is secured to rock shaft 29 and has a lug 30 formed thereon to engage between first ends of the levers. A coil spring 31 normally biases the first ends of the levers towards each other and into engagement with lug 30.

A roller 32, mounted on an end of an arm 33, engages between second ends of the levers to selectively rotate the same to thus oscillate shaft 29 in the desired direction. Arm 33 is suitably clamped onto input shaft 26 whereby pivotal movements of the input shaft will rotate arm 33 to actuate levers 28.

The embodiments of the invention in which an exclusive property or privilege is claimed are defined as follows:

1. A transmission and throttle control arrangement comprising
    transmission control means having a rotary input shaft,
    a bellcrank secured to said input shaft and having first and second arms
    throttle control means,
    actuating means movably mounted on a support for movement between first and second positions,
    a first link means interconnected between said actuating means and the first arm of said bellcrank and reciprocal in a first direction upon movement of said actuating means to its first position and reciprocal in a second direction opposite to said first direction upon movement of said actuating means to its second position, and
    a second link means interconnected between the second arm of said bellcrank and said throttle control means for movement in the same direction to actuate said throttle control means in only one direction in response to actuation of said actuating means to both its first and second positions.

2. The transmission and throttle control arrangement of claim 1 wherein said first link means is pivotally connected directly to the first arm of said bellcrank.

3. The transmission and throttle control arrangement of claim 1 wherein said second link means is pivotally connected directly to the second arm of said bellcrank.

4. The transmission and throttle control arrangement of claim 1 wherein said throttle control means comprises a rotary input shaft having a control lever secured thereon.

5. The transmission and throttle control arrangement of claim 4 wherein said second link means is pivotally connected directly to said control lever.

6. The transmission and throttle control arrangement of claim 1 wherein said actuating means comprises a foot pedal pivotally mounted on said support.

* * * * *